United States Patent [19]

Weissburg

[11] Patent Number: 4,972,218
[45] Date of Patent: Nov. 20, 1990

[54] PHOTOGRAPHIC FILM ASSEMBLAGE

[75] Inventor: David L. Weissburg, Medford, Mass.

[73] Assignee: Polaroid Corporation, Cambridge, Mass.

[21] Appl. No.: 412,163

[22] Filed: Sep. 25, 1989

[51] Int. Cl.⁵ .............................................. G03B 17/26
[52] U.S. Cl. ................................................ 354/276
[58] Field of Search ................... 354/83, 86, 180, 276, 354/277, 278, 279

[56] References Cited

U.S. PATENT DOCUMENTS 3,595,661  7/1971  Gold ..................................... 354/276
3,705,542  12/1972  Gold ..................................... 354/180
3,779,143  12/1973  Harvey .................................. 354/86
4,392,731  7/1983  Van Heyningen ............... 354/83 X Primary Examiner—Brian W. Brown
Attorney, Agent, or Firm—Alfred E. Corrigan

[57] ABSTRACT

A film assemblage includes a film cassette having opposed forward and rear walls and a spring platen which resiliently engages a stack of film units to urge them toward the forward wall. A coupling is provided for coupling the spring platen to the rear wall such that the two remain coupled to each other during the period that the spring platen is in an unstressed or non-compressed state.

15 Claims, 2 Drawing Sheets

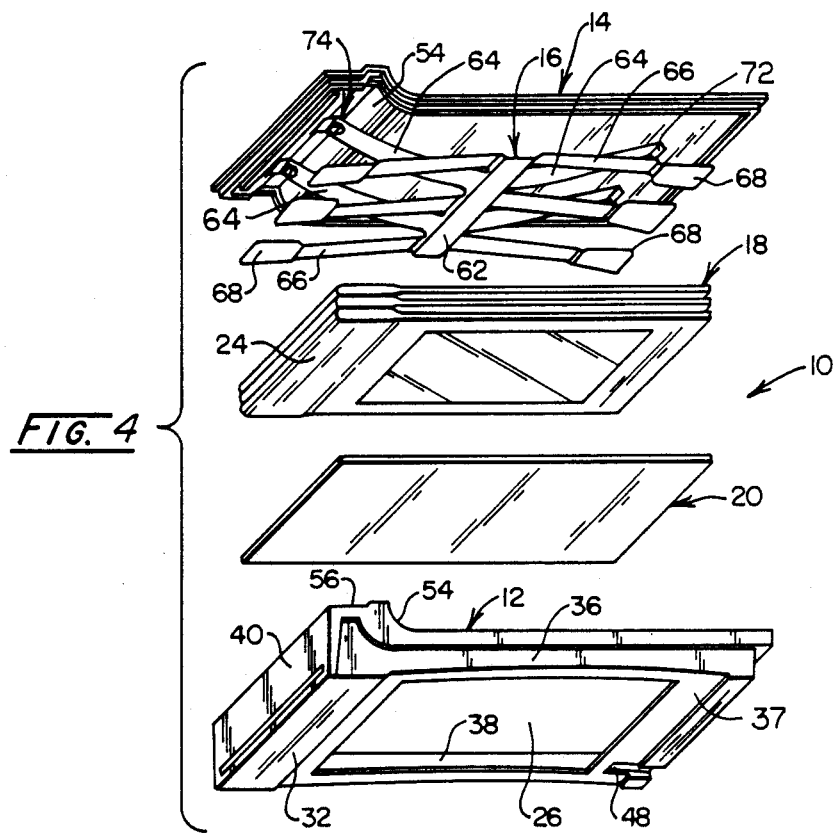
FIG. 4
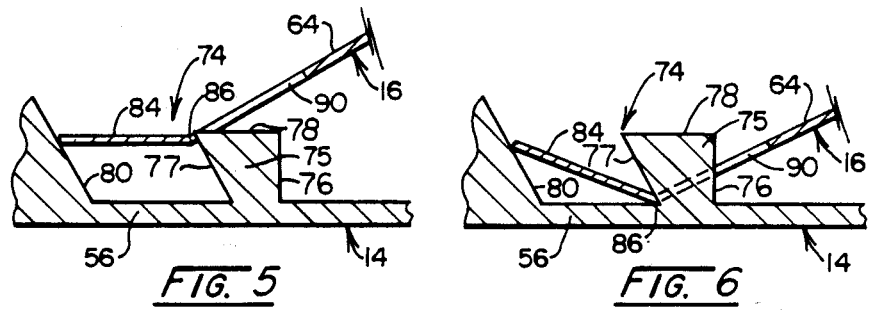
FIG. 5
FIG. 6
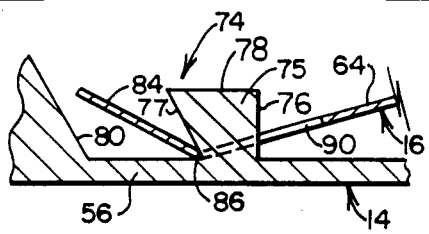
FIG. 7

PHOTOGRAPHIC FILM ASSEMBLAGE

BACKGROUND OF THE INVENTION

1. Field of the Invention

This invention relates to a film assemblage comprising a film cassette or cartridge for storing a plurality of film units in stacked relationship for successive exposure in a photographic camera. The film assemblage includes a spring platen for resiliently supporting a plurality of film units stacked thereon for movement toward an exposure window in a forward wall of the cartridge.

2. Description of the Prior Art

This invention deals with a photographic film assemblage comprising a film cartridge or cassette of the general type disclosed in U.S. Pat. No. 3,705,542, for storing a plurality of film units in stacked relationship for successive exposure in a photographic camera. The cassette includes a casing having spaced walls including a forward wall having a film exposure opening, a leading end wall having a withdrawal opening therein through which the film units are sequentially withdrawn and a rear wall. A spring platen is disposed within the casing and is supported by the rear wall for urging film units stacked thereon toward the forward wall. The platen in the '542 patent includes feet extending downwardly into depressions in the rear wall. This type of supporting or fastening means between the platen and the rear wall holds the spring platen in place when film units are withdrawn. Variations in the force exerted by the spring platen on the successive film units occur because the spring platen bias decreases with each film unit withdrawal. Also, with this arrangement, assembly of the platen and the cassette is difficult because of possible separation of the platen from the bottom wall if the assembly is rotated into an inverted position during loading of a stack of the film units, that is, there is no positive lock between the spring platen and the bottom wall.

SUMMARY OF THE INVENTION

The film assemblage of this invention is adapted to be used with a photographic camera of the instant type and comprises a film cassette including a chamber defined by forward and rear walls, a pair of side walls and leading and trailing end walls. The leading end wall includes means defining an egress opening through which a film unit may be advanced to the exterior of said film cassette, and the trailing end wall includes means defining an opening for receiving a part of a camera mounted film advancing apparatus. A plurality of film units are adapted to be stacked within said chamber and a spring platen is provided for supporting a stack of the film units and for urging them towards the forward wall with the uppermost film unit in the stack being located in alignment with the egress opening.

A special arrangement is provided for coupling the spring platen to the rear wall of the cassette to prevent separation of the platen from the rear wall during assembly. This coupling arrangement is such that before and during assembly of the cassette with the film units, the spring platen is so coupled to the rear wall that the cassette may be inverted to facilitate assembly and, after assembly, the coupling will have no effect on the force rate of the platen, i.e., it will allow uniform urging of the successive film units toward the forward wall.

BRIEF DESCRIPTION OF THE DRAWINGS

The best mode contemplated in carrying out this invention is illustrated in the accompanying drawings in which:

FIG. 4 is an inverted exploded perspective view of the film assemblage; and

FIGS. 5 to 7 are schematic views showing the integration of the spring platen with the rear wall of the cassette.

DETAILED DESCRIPTION OF THE DRAWINGS

Figure 1:
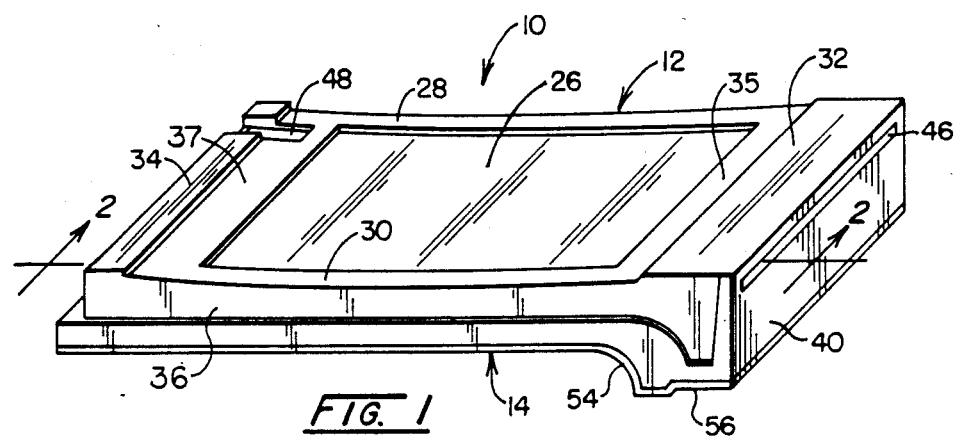
FIG. 1 is a perpsective view of the film assemblage.
Figure 2:
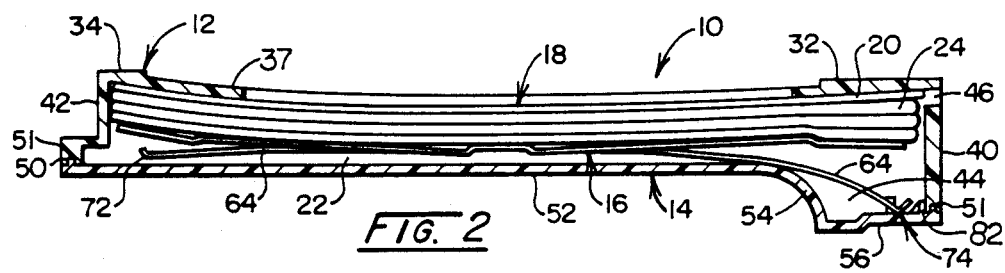
FIG. 2 is a sectional view taken along line 2—2 of FIG. 1.

With reference to the drawings and particularly to FIGS. 1 to 4, a film assemblage for use with a photographic camera of the instant type comprises, according to this invention, a cassette indicated generally at 10 and which includes a film box formed by forward and rear walls units 12 and 14, respectively, a spring platen 16 adapted to be coupled to the rear wall unit 14, a stack of a predetermined number of film units and a dark side 20. When assembled, a lighttight chamber 22 is provided. FIG. 4 shows how these units may be assembled and FIGS. 1 and 2 show the units assembled into the cassette 10.

The forward wall unit 12 is indicated in a top position in FIGS. 1 and 2 and in a bottom position in FIG. 4. The rear wall unit 14 is shown in a bottom position in FIGS. 1 and 2 and in a top position in FIG. 4. The wall units 12 and 14 may be formed, for example, of opaque injection molded plastic. The spring platen 16 may be formed of a suitable spring steel. The film units 18 in the stack are of the selfdeveloping type and each includes a rupturable container or pod 24 of processing liquid at its leading end which is adapted to be spread between layers of the film unit upon rupturing of the pod 24 by passing between pressure rollers in a camera in the usual manner to initiate formation of a visible image. The ends of the film units with the rupturable containers 24 at their leading end are shown in FIG. 2. The dark side 20 may be of suitable opaque material such as plastic.

The wall unit 12 is considered as the forward wall since, when the cassette is positioned in the camera it will be facing in the direction of light impingement through an exposure opening or window 26 formed in that wall unit. Marginal flanges outline the opening 26 and include a pair of parallel side flanges 28 and 30, a flange portion 32 at the cassette's leading end and a flange portion 34 at the cassette's trailing end. Offset extensions 35 and 37 project toward each other from flanges 32 ad 34, respectively. The flange portions provide marginal stop surfaces against which each successive film unit 18 is urged by the spring platen 16. It will be noted that extensions 35 and 37 and flanges 28 and 30 are downwardly or inwardly curved which will provide similar curving of film units 18.

Each of the flange portions 28, 30, 32 and 34 has downwardly-extending wall forming flanges at right angles thereto which form side walls 36 and 38, a leading end wall 40 and a trailing end wall 42, respectively, for the chamber 22. It will be noted that the wall-forming flange 40 at the leading end of the cassette is deeper than the wall-forming flange 42 at the trailing end of the cassette 10. As best illustrated in FIG. 2, the cassette 10 provides an enlargement 44 of the chamber 22 at that end to accommodate the film pods 24 and for other reasons which will be explained subsequently.

At the corner junction of the flange 32 and the leading end wall 40 an egress slot 46 is provided through which the dark slide 20 and the film units 18 can be moved to the exterior of the cassette 10. The dark slide 20 is preferably automatically fed through the film egress slot 46 after the cassette 10 has been positioned in a camera and its loading door closed.

The camera (not shown) will have film advancing means common in the art that extends through a slot 48 formed in wall 42 and flange 34 at the trailing end of the cassette.

As best seen in FIG. 2, each of the flanges 36, 38, 40 and 42 has a tongue-receiving groove 50 formed in its inner edge to receive a mating tongue 51 projecting from the rear wall 14. The tongue and groove may be bonded together after the cassette 10 is assembled by any suitable means, preferably by ultrasonic welding.

The rear wall unit 14 has a substantially flat bode 52 but at its leading edge provided with an outwardly curved portion 54 which connects it to a flat support flange 56 that is in a plane parallel to that of the flat body 52, this formation cooperates with the leading end wall 40 of forward wall unit to produce the enlargement 44 of the chamber 22 at its leading end.

As indicated, when the spring platen 16 is assembled in the cassette 10, it is adapted to support and urge the film units 18 successively into position adjacent the exposure opening 26 in the forward wall unit 12 for exposure by action of the camera in which the cassette is to be inserted. In this embodiment of the invention the spring platen 16 is of the shape shown best in FIG. 4 and is made of suitable material, such as cold rolled steel, so it will be resilient. It includes a transverse support bar 62 which has a pair of integral spring legs 64 extending from each side thereof and being arched into engagement with body 52 of the rear wall unit 14. The bar 62 also has integral spring arms 66 extending from each side thereof being shown as three in number to fit laterally at opposite sides of the legs 64. The arms 66 are deflected in a direction away from the legs 64 and each has an enlarged tab 68 formed as its outer end which is adapted to contact an adjacent film unit 18 when the cassette 10 is assembled.

As best seen in FIG. 2, the trailing ends 72 of the spring legs 64 are adapted to slide on body 52 when the cassette 10 is assembled. The legs 64 at the opposite end of the spring platen 16 are adapted to curve into the enlargement 44 of the chamber 22. During the assembly of the platen 16 with the rear wall unit 14, the legs 64 are coupled thereto by a special coupling indicated generally by the numeral 74 in FIG. 2 and 4 and shown in detail in FIG. 3 and 5 to 7. Two of these couplings are indicated since two of the legs 64 are shown but these legs and couplings could be of one or more in number. The legs 64 are spaced laterally to correspond with the spacing of the couplings.

Figure 3:
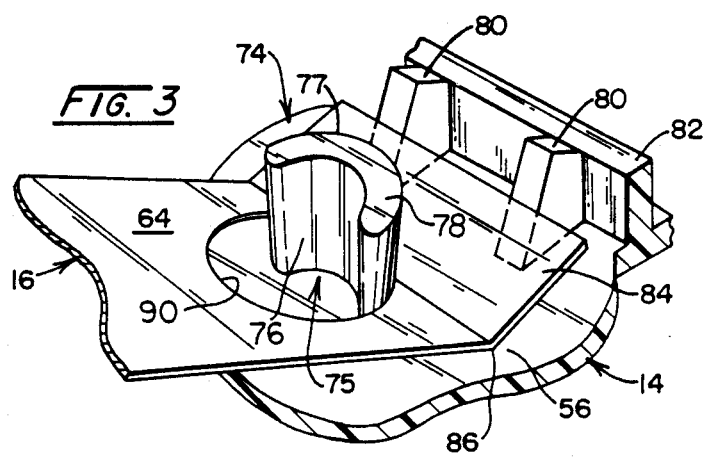
FIG. 3 is an enlarged detail view in perspective of one of the means for coupling a spring platen of the assemblage to a rear wall of a film cassette.

Each coupling 74 includes an upwardly extending post 75 which is formed integral with the flange 56 of the wall unit 14. FIG. 3 illustrates the post 75 as a generally C-shaped projection with an inside surface 76 and an outside surface 77. This post 75 has its outside surface 77 tapered inwardly in a downward direction from its top 78 to wall 14 for reasons which will be explained subsequently. Preferably, this taper defines an angle of approximately seventy (70) degrees with the flange 56.

Facing the outside surface 77 of each post 75 are a pair of integral, laterally spaced inclined ramps 80 (best seen in FIG. 3 and 5 to 7) which are formed on the inner surface of the flange 56 and inwardly of an upstanding shoulder 82 which extends transversely of the flange 56. The lower adjacent end of each of the two platen legs 64 is provided with an integral foot 84 which is joined thereto at a fulcrum providing, angle bend of transverse line 86. The foot 84 ends with a ramp-engaging tip at its extremity.

Each of the two legs 64 includes, at the bend 86, a postreceiving opening 90 and it will be noted that this opening is circular and larger in diameter than C-shaped post 75. The cut back side 77 combines with the oversized opening 90 to enhance the gripping action of the foot 84 when in the condition shown in FIG. 3. The oversize opening 90 has its leading edge at the bend 86. Each of the tips engages two adjacent ramps 80 which biases the foot 84 against the surface 77 of the post 75 to provide a positive lock between the platen 16 and the post 75.

In assembling the units 12, 14, 16, 18, and 20 to form the film assemblage it is usually simpler to invert them as shown in FIG. 4. But once the units 14 and 16 are connected they will not readily separate in any position. Rear wall unit 14 will be in inverted position and the spring platen 16 will be coupled to that wall unit by the coupling 74 in such a manner that they will not seperate. At this time the spring platen 16 will be in expanded relaxed condition as shown in FIG. 4.

In mounting the spring platen 16 on the rear wall unit 14, the resilient legs 64 thereof are positioned as shown in FIG. 5 with the foot 84 of each leg positioned between the tapered surface 77 on the cooperating post 75 and its tip in contact with the inclined surface of each of the pair of cooperating ramps 80. At this time the oversize hole 90 and ramps 80 act as lead in features. If the foot 84 is now pushed downwardly by manipulating the platen 16, the inside edge of the hole 90 slides down the tapered surface 77 of each post 75. During this movement the foot 84 bends farther at the angle bend 86 as indicated in FIG. 6 until it bottoms out on the flange 56. Also during this movement the tabs 68 on spring legs 66 will slide outwardly on body 52. At this time the posts 75 will extend completely through the openings 90 and this condition will continue at all times during continued assembly and use of the cassette. Thus, the spring platen 16 will not drop off the wall unit 14.

In continuing the assembly, the rear wall unit 14 is moved toward the forward wall unit 12 with a group of film units 18 and the dark slide 20 sandwiched therebetween in engagement with the spring platen 16 which is still not compressed and the legs 64 thereof will be directed so that the feet 84 thereof will be positioned in the enlargement 44 of the chamber 22. The rear wall unit 14 and the forward wall unit 12 will eventually come together with their marginal edges in alignment so that the groove 50 and tongue 51 interfit and can be sealed together.

As these wall units are brought together the spring platen 16 will be compressed as it is flattened and resiliently biases the film stack against the forward wall 12. As the rear wall unit 14 is moved into engagement with the wall unit 12 and gradually compresses the spring platen 16, the force on the ramps 80 is reduced to zero by pivoting of the legs 64 about fulcrum bend 86 and each foot tip loses contact with its ramps 80 as indicated in FIG. 7. Each foot 84 can now pivot freely at the fulcrum formed at the angle bend 86. At this time neither the posts 75 nor the ramps affect the spring pressure although the posts 75 will still engage the feet 84 at the bends 86 to prevent movement of the spring platen 16 towards the egress slot 46 as the dark slide 20 and film units 18 are successively advanced from the stack.

When the coupling is in the condition shown in FIG. 6, due to the fact that the spring platen 16 is expanded, the feet 84 will fit tightly between the ramps 80 and the adjacent posts 75. This will produce in effect a cantilever support for the platen 16. Thus, even if the rear wall unit 14 is moved into various positions, including an inverted position during loading of the cassette 10, the platen 16 will not separate from the rear wall unit 14. However, when the spring platen 16 is compressed, the tips of the feet 84 move away from the inclined ramp surface 80 to the condition shown in FIG. 7 and there will be no force on the legs 64 to affect the spring rate thereof, the legs 64 merely pivoting around the fulcrum bends 86. However, since the posts 75 still extend through the openings 90, the spring platen 16 will be prevented from moving toward the egress opening 46.

It will be apparent from the above that this invention provides a cassette including opposed forward and rear walls enclosing a spring platen which will resiliently engage a stack of film units to urge them successively toward an exposure opening in the forward wall. Special means is provided for coupling the spring platen to one of the walls and this coupling means functions differently when the spring platen is in expanded condition vis-a-vis a compressed condition. When in the expanded condition of the spring platen, the coupling functions to prevent separation of the spring platen from its supporting wall unit which facilitates assembly of the units. When in the compressed condition of the spring platen, the coupling functions to prevent movement of the spring platen towards a film egress but has no effect on the spring rate or pressure of the spring platen.

Since certain changes may be made in the above product without departing from the scope of the invention herein involved, it is intended that all matter contained in the above description or shown in the accompany drawings shall be interpreted as illustrative and not in a limiting sense. For example, while the forward wall of the film cassette has been described as having an exposure opening therein, it could be omitted and the film units would be photographically exposed after their removal from the film cassette.

What is claimed is:

1. A film asemblage for use with a photographic camera, said film assemblage comprising:
   a film cassette including a chamber defined by forward and rear walls, a pair of side walls, and leading and trailing end walls, said leading end wall including means defining an egress through which a film unit may be advanced from said film cassette, and said trailing end wall including means defining an opening for receiving a portion of a film advancing apparatus;
   a plurality of individual self-developing film units stacked within said chamber;
   means for resiliently supporting said stack of film units and for urging them towards said forward wall such that an endmost film unit in said stack is located in alignment with said egress, said supporting means including a spring platen having a plurality of legs extending therefrom into engagement with said rear wall, at least one of said legs including an opening in an end thereof; and
   means extending upwardly from an interior surface of said rear wall through said opening in said at least one leg of said spring platen for coupling said spring platen to said rear wall in a manner whereby said at least one leg applies a force to said upwardly extending means to prevent said spring platen from uncoupling itself from said rear wall only as long as said spring platen is in a non-compressed state and for releasing said force on said upwardly extending means when said spring platen is in a compressed state to thereby render said at least one leg ineffective to change a spring rate of said spring platen.

2. A film assemblage according to claim 1 in which said spring platen has leading and trailing ends and said rear wall has corresponding leading and trailing ends, said upwardly extending means comprising a post which is part of the coupling and extends upwardly through said opening, said post being located adjacent the leading end of said rear wall and said opening being located adjacent said leading end of said spring platen for receiving said post.

3. A film assemblage according to claim 2 in which said opening is substantially larger than a cross-section of said post and said post engages the opening at an edge located in a direction of said leading end of said spring platen.

4. A film assemblage according to claim 3 in which said post is curved at a leading side so that the opening is oversized relative to said post.

5. A film assemblage according to claim 4 in which said post is of semi-circular form and said opening is circular.

6. A film assemblage according to claim 3 in which said at least one leg includes a foot at a leading end, said foot extending from an end of said leg along a transverse line so as to define an obtuse angle with said leg, said opening having its leading edge at said transverse line.

7. A film assemblage according to claim 6 in which said spring platen comprises a body having oppositely extending filmengaging spring legs for engaging the lower end of the film stack and having rear wall engaging spring legs comprising a first set of spring legs including said at least one leg extending therefrom towards the leading end of said spring platen and a second set of spring legs extending therefrom towards the trailing end of said spring platen, each of said first set of legs having said openings therein.

8. A film assemblage according to claim 7 including a bearing surface on said rear wall adjacent its trailing end, and each of said second set of legs having an end slidably engaging said bearing surface during compression of said spring platen.

9. A method of assembling a film assemblage comprising:
   providing a film cassette comprising (1) a forward wall unit having an exposure opening, a leading end wall having an egress opening therein, and (2) a bottom wall unit having means extending upwardly from an inner surface thereof, a spring platen having a plurality of resilient legs at least one of which is formed with an opening in an end thereof, a stack of self-developing film units, and a dark slide;

coupling the spring platen to the rear wall unit by inserting the upwardly extending means through the opening in the at least one resilient leg of the spring platen while simultaneously applying a compressive force to the spring platen;
releasing the compressive force on the spring platen;
positioning the forward and rear wall units on opposite sides of the stack film units and the dark slide with the dark slide located between (a) an endmost film unit in the stack and (b) the exposure opening, and the other endmost film unit located adjacent the spring platen;
moving the forward and rear wall units toward each other while simultaneously compressing the spring platen; and
bonding the forward and rear wall units together so that a lighttight chamber is formed therebetween.

10. The method of claim 9 in which the upwardly extending means and a portion of the rear wall unit provide an upwardly opening socket and the method further includes the step of sliding the opening in a leg over an upwardly extending means with a foot of each leg located in a socket.

11. A film message for use with a photographic camera, said film assemblage comprising:
a film cassette including a chamber defined by forward and rear walls, a pair of side walls, and leading and trailing end walls, said leading end wall including means defining an egress through which a film unit may be advanced from said film cassette, said trailing end wall including means defining an opening for receiving a portion of a film advancing apparatus, and said rear wall including leading and trailing ends;
a plurality of individual self-developing film units stacked within said chamber;
means for resiliently supporting said stack of film units and for urging them towards said forward wall such that an endmost film unit in said stack is located in alignment with said egress, said supporting means including a spring platen having a plurality of legs extending therefrom into engagement with said rear wall, at least one of said legs including an opening in an end thereof, said spring platen having leading and trailing ends; and
means extending upwardly from an interior surface of said rear wall through said opening in said at least one leg of said spring platen for coupling said spring platen to said rear wall in a manner whereby said spring platen is substantially prevented from uncoupling itself from said rear wall as long as said spring platen is in a non-compressed state, said upwardly extending means comprising a post having a leading side which is part of the coupling and extends upwardly through said opening, said post being located adjacent said leading end of said rear wall and said opening being located adjacent said leading end of said spring platen for receiving said post, said opening being larger than a cross-section of said post and said post engages said opening at an edge located in a direction of said leading end of said spring platen, said at least one leg includes a foot at a leading end thereof, said foot extending from an end of said leg so as to define an obtuse angle with said leg, said opening having a leading edge at a traverse line, said rear wall further includes at least one upstanding inclined ramp at said leading end, said foot being of a length as measured from said transverse line to a terminal end thereof substantially the same as that of a spacing between said leading side of said post and an inclined surface of said ramp.

12. A film assemblage according to claim 11 in which said spacing of said leading side of the post from said ramp surface provide an upwardly-opening transverse socket for receiving said foot.

13. A film message for use with a photographic camera, said film assemblage comprising:
a film cassette including a chamber defined by forward and rear walls, a pair of side walls, and leading and trailing end walls, said leading end wall including means defining an egress through which a film unit may be advanced from said film cassette, said trailing end wall including means defining an opening for receiving a portion of a film advancing apparatus, and said rear wall including leading and trailing ends;
a plurality of individual self-developing film units stacked within said chamber;
means for resiliently supporting said stack film units and for urging them towards said forward wall such that an embodiment film unit in said stack is located in alignment with said egress, said supporting means including a spring platen having a plurality of legs extending therefrom into engagement with said rear wall, at least one of said legs including an opening in an end thereof, said spring platen having leading and trailing ends; and
means extending upwardly from an interior surface of said rear wall through said opening in said at least one leg of said spring platen for coupling said spring platen to said rear wall in a manner whereby said spring platen is substantially prevented from uncoupling itself from said rear wall as long as said spring platen is in a non-compressed state, said upwardly extending means comprising a post which is part of the coupling and extends upwardly through said opening, said post being located adjacent said leading end of said rear wall and said opening being located adjacent said leading end of said spring platen for receiving said post, said opening is larger than a cross-section of said post and said post engages said opening at an edge located in a direction of said leading end of said spring platen, said at least one leg includes a foot at a leading end thereof, said foot extending from an end of said leg at a transverse line so as to define an obtuse angle with said leg, said opening having a leading edge at said traverse line, said spring platen comprises a body having oppositely extending film-engaging spring legs for engaging the lower end of said film stack and having rear wall engaging spring legs comprising a first set of spring legs including said at least one leg extending therefrom towards said leading end of said spring platen and a second set of spring legs extending therefrom towards said trailing end of said spring platen, each of said first set of legs having said openings therein, a bearing surface on said rear wall adjacent said trailing end thereof, and each of said second set of legs having an end slidably engaging said bearing surface during compression of said spring platen, said rear wall is outwardly curved at said leading end to provide an outwardly displaced flange on which said upwardly extending means is located and to provide an enlargement of said chamber into which said leading ends of the said first set of spring legs extend.

14. A film assemblage according to claim 13 in which said leading ends of said first set of spring legs extending into said enlargement of said chamber are in contact with said outwardly curved leading end of the rear wall.

15. A film assemblage for use with a photographic camera, said film assemblage comprising:

a film cassette including a chamber defined by forward and rear walls, a pair of side walls, and leading and trailing end walls, said leading end wall including means defining an egress through which a film unit may be advanced from said film cassette, said trailing end wall including means defining an opening for receiving a portion of a film advancing apparatus, and said rear wall including leading and trailing ends;

a plurality of individual self-developing film units stacked within said chamber;

means for resiliently supporting said stack of film units and for urging them towards said forward wall such that an endmost film unit in said stack is located in alignment with said egress, said supporting means including a spring platen having a plurality of legs extending therefrom into engagement with said rear wall, at least one of said legs including an opening in an end thereof;

means extending upwardly from an interior surface of said rear wall through said opening in said at least one leg of said spring platen for coupling said spring platen to said rear wall in a manner whereby said spring platen is substantially prevented from uncoupling itself from said rear wall as long as said spring platen is in a non-compressed state, and said spring platen further including leading and trailing ends, said upwardly extending means comprising a post which is part of the coupling and extends upwardly through said opening, said post being located adjacent said leading end of said rear wall and said opening being located adjacent said leading end of said spring platen for receiving said post, said forward wall further including a marginal flange against which said spring platen urges the uppermost film unit in said stack, said marginal flange including a pair of parallel side portions, an end flange portion at a leading end of said cassette and an end flange portion at a trailing end of said cassette thereby forming an exposure opening, said end flange at said trailing end of said cassette and said parallel portions being curved inwardly to produce in combination with said spring platen a similar curve in each of said film units stacked thereagainst.

* * * * *